Feb. 12, 1929.
R. H. BINNS
FLEXIBLE CLOSURE
Filed Dec. 21, 1923
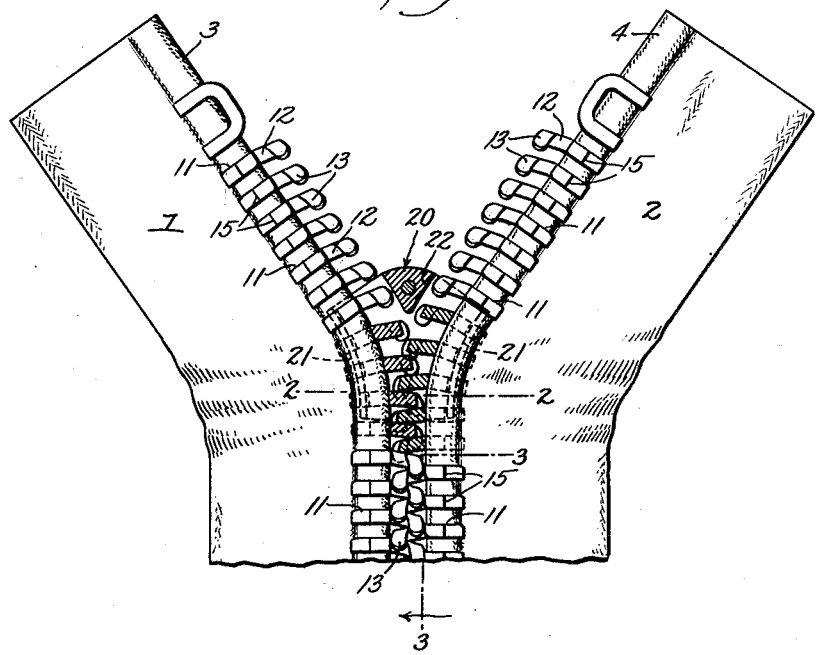
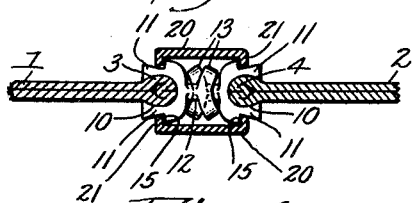
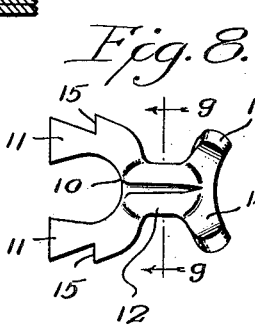
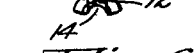
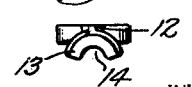
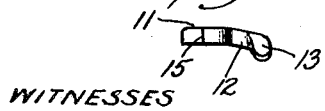

Patented Feb. 12, 1929.

1,701,555

UNITED STATES PATENT OFFICE.

RALPH H. BINNS, OF PITTSBURGH, PENNSYLVANIA, ASSIGNOR OF FIVE-SEVENTHS TO EDWARD H. BINNS, OF PITTSBURGH, PENNSYLVANIA.

FLEXIBLE CLOSURE.

Application filed December 21, 1923. Serial No. 682,022.

The present invention relates to improvements in flexible closures of the type having two flexible strips or stringers carrying interlocking fastening devices and a sliding cam device for moving said fastening devices into and out of locking engagement.

The object of the present invention is to improve this form of flexible closure, with a view to neatness in appearance, greater flexibility, increased security and better lasting qualities.

To this end the improved flexible closure consists of flexible tapes or stringers having secured to their inner edges two series of interlocking fastening devices engaged and actuated by a sliding cam device, the individual fastening devices each comprising a metal body formed with an unobstructed upper face, a narrow rounded neck and a forked hook projecting away from its unobstructed face. When the fastening devices under the control of the sliding cam device are moved into interlocking engagement, the forked hook of each fastening device of one series is caused to straddle the neck and engage the forked hook of another fastening device of the other series, the unobstructed upper faces of the fastening devices permitting the forked hook ends of adjacent members to readily move into and out of engaged position. The narrow necks between the forked hook ends and the yoke portions attached to the flexible stringers or tapes are rounded on their upper surfaces to engage the correspondingly rounded recesses of the forked hook ends, thereby providing swivelled joints between the engaged fastening devices that afford great flexibility in the closure fastener. The individual fastening devices are formed upon their side edges with shoulders for the engagement of the inwardly presented cam flanges of the operating slider, thereby providing a sectional flanged track for the slider which prevents contact of the slider walls with the flexible strips or stringers.

In order that the invention may be fully understood, it will first be described with reference to the accompanying drawings and afterwards pointed out more particularly in the annexed claims.

In said drawings:

Figure 1 is a front view of a portion of a flexible closure embodying the present invention.

Figure 2 is a transverse sectional view of the same taken on the line 2—2 of Figure 1.

Figure 3 is a detail vertical sectional view of the same taken on the line 3—3 of Figure 1.

Figure 4 is a detail plan view of one of the individual fastening devices.

Figure 5 is an edge view of the same.

Figure 6 is a bottom plan view of the same.

Figure 7 is an end view of the same.

Figure 8 is a view similar to Figure 6 on an enlarged scale.

Figure 9 is a sectional view taken on line 9—9 of Figure 8.

In constructing the flexible closure of the type to which the present invention relates, two flexible strips or stringers, such as indicated at 1 and 2, are formed at their inner edges with beads or thickened portions 3 and 4 for the engagement of the interlocking fastening devices. These flexible tapes or stringers with beaded inner edges may be formed in any suitable way, but I prefer to form the bead or thickened edge by centrally folding a wide tape back and forth upon itself in accordance with the invention set forth in the application of William A. De Hart, Serial No. 678,663, filed December 5th, 1923, for improvements in flexible closures.

Each of the stringers 1 and 2 is provided on its inner thickened edge with a series of fastening devices which are adapted to interengage for the purpose of locking together the two stringers. The present invention resides in the form of these fastenings devices and their cooperative action under the control of the slider. All of the fastening devices of both series are of exactly the same structure.

Each fastening device is made from a blank of sheet metal stamped out and shaped with suitable tools. Each fastening device is formed with a U-shaped body or yoke 10 providing compressible clamping arms 11, which embrace and are compressed upon the beaded or thickened edge of a flexible tape or stringer, a narrow neck 12 arched in cross-section having a rounded upper face and forked hook 13 deflected inwardly and projecting downwardly from the upper unobstructed face of the fastening device. The formation of arched or grooved narrow necks 12 with rounded upper face is preferably accomplished by compressing and upsetting the metal of the stamped out blank, thereby retaining the entire strength of the cross-sectional area of the neck and stiffening the same by thus shaping it into an arch. The forked hook 13 has two downwardly presented prongs or arms separated by the curved or arched recess 14 shaped to accurately fit over the curved narrow neck 12 of an adjacent fastening device of the opposite series. The arms 11 of yoke 10 are formed in their side walls with shoulders 15 for the engagement of the operating slider, said shoulders being formed as close as practicable to neck 12 in the interest of accurate control of the fastening devices by the slider.

As shown particularly in Figures 1 and 2, the individual fastening devices are clamped upon the thickened edges of the stringer members 1 and 2 by fitting the yokes 10 over said thickened portions and compressing the arms 11 together to securely clamp said thickened portion. The individual fastening devices are suitably spaced upon their respective stringer members, so as to present them in alternate relation with the two series of fastening devices.

20 is the operating slider of well known construction comprising upper and lower plates with inwardly presented cam walls 21, which engages the outwardly presented shoulders 15 of the fastening devices and a central spreading cam 22 that engages the inner hook ends of the fastening devices. The slider member is shown partly in section and partly in dotted lines in place upon the two series of fastening devices in Figure 1 of the drawings. The fastening devices are shown, some of them in engaged position and some in disengaged position. The engaged fastening devices have their forked hook ends straddling the curved narrow necks of adjacent devices, with the hooks in engagement with the rearwardly presented shoulders of said adjacent devices. A fastening device of one series is presented between and interlocked with two adjacent fastening devices of the opposite series, the spacing of the fastening devices being such that when they are in locked position each device is confined in engagement by a device above it. The cam walls 21 of the slider move the fastening devices inwardly into engagement with each other when the slider is moved upwardly, the hook end of each device passing freely over the unobstructed upper face of a corresponding device beneath it. The spreading cam 22 of the slider engages the inner hook ends of the fastening devices for disengaging and separating them when the slider is moved downwardly upon the closure. The location of shoulders 15 between the ends of the fastening devices and as near as practicable to the narrow necks 12 is important in providing accurate control by the slider of the movement of the fastening devices into interlocking engagement;—it being clear that the closure to the hook ends of the fastening devices that the slider engages, the more positively will the movement of the devices be effected. The construction is such that the hooks of one series in engagement with the hooks of the other series are offset or deflected inwardly below the level of the shouldered yokes of the interlocked members, for the purpose of guarding the hooks against entanglement with materials in proximity.

The engagement of the rounded sockets of the forked hook ends with the rounded narrow necks of adjacent fastening devices provides a series of swivelled interlocking joints permitting great flexibility of the closure. The interengaging forked hooks of the fastening devices insure great security of the closure lock. Since the operating slider is mounted upon the shouldered fastening devices, it will be observed that it travels only upon the fastening devices and is held entirely out of contact with the fabric of the flexible tapes or stringers, thereby avoiding the objectionable wear upon the fabric of the stringer.

I claim:

1. In a flexible closure or fastener, the combination of flexible strips, with two series of interlocking fastening devices rigidly mounted upon said strips, said fastening devices being formed with shoulders between their ends, and an operating member sliding upon said shouldered fastenings devices and supported thereby out of contact with said flexible strips.

2. In a flexible closure or fastener, the combination of flexible strips, with two series of interlocking fastening devices rigidly mounted upon said strips, said fastening devices comprising shouldered bodies formed with inwardly presented interlocking members, and an operating member sliding only upon the shouldered bodies of said fastening devices and supported out of contact with said flexible strips.

3. In a flexible closure or fastener, the combination of flexible strips, with two series of interlocking fastening devices mounted upon said strips, each fastening device comprising a shouldered body formed with an inwardly presented forked hook and a narrow neck, the hook of one fastening device of one series straddling the neck and engaging the hook of another device of the other series, and an operating member sliding upon the shouldered bodies of said fastening devices and supported out of contact with said flexible strips.

4. In a flexible closure or fastener, the combination of flexible strips, with two series of interlocking fastening devices mounted upon said strips, each fastening device comprising a body formed with an inwardly presented forked hook, a narrow neck and shoulders adjacent to said neck, the hook of one fastening device of one series straddling the neck and engaging the hook of another device of the other series, and an operating member sliding upon the shouldered portions of said bodies and supported thereby out of contact with said flexible strips.

5. In a flexible closure or fastener, the combination of two flexible strips, with a series of interlocking devices mounted upon each of said strips, each interlocking device comprising a shouldered body formed with an offset inwardly presented arched neck carrying a forked hook, the hook of one fastening device of one series straddling the neck and engaging the hook of another device of the other series, and an operating member sliding upon the shouldered bodies of said interlocking devices and supported out of contact with said flexible strips.

6. In a flexible closure or fastener, the combination of flexible strips, with two series of interlocking fastening devices mounted upon said strips, each fastening device comprising a body formed with an unobstructed upper face, an inwardly presented recessed head projecting away from said unobstructed face and a narrow neck, the recessed head of one fastening device of one series straddling the neck and swivelling upon the recessed head of another device of the other series, and an operating device therefor.

7. In a flexible closure or fastener, the combination of flexible strips, with two series of interlocking fastening devices mounted upon said strips, each fastening device comprising a body formed with an inwardly presented recessed hook and a narrow rounded neck, the recessed hook of one fastening device of one series straddling the rounded neck and swivelling upon the hook of another device of the other series, and an operating member having sliding engagement with said fastening devices.

8. In a flexible closure or fastener, the combination of two flexible strips, with two series of fastening devices mounted upon the inner edges of said strips and projecting therefrom toward each other in the general plane of said strips, each fastening device comprising a body formed with an unobstructed upper face, a narrow neck and a forked hook, said hook projecting downwardly away from said unobstructed face, the forked hook of each fastening device of one series straddling the neck and engaging the forked hook of another device of the other series, and an operating member having sliding engagement with the two series of fastening devices to move them into and out of locking relation.

9. In a flexible closure or fastener, the combination of two flexible strips, with two series of fastening devices mounted upon said strips and projecting therefrom toward each other, each fastening device comprising a body formed with an unobstructed upper face, a narrow rounded neck and a recessed forked hook projecting away from its unobstructed face, the forked hook of each fastening device of one series straddling the neck and swivelling thereon back of the forked hook of another device of the other series, and an operating member having sliding engagement with the two series of fastening devices to move them into and out of locking relation.

RALPH H. BINNS.